US008639802B2

(12) United States Patent
Zhou

(10) Patent No.: US 8,639,802 B2
(45) Date of Patent: Jan. 28, 2014

(54) DYNAMIC PERFORMANCE MONITORING

(75) Inventor: Ning Zhou, San Jose, CA (US)

(73) Assignee: Brocade Communications Systems, Inc., San Jose, CA (US)

(*) Notice: Subject to any disclaimer, the term of this patent is extended or adjusted under 35 U.S.C. 154(b) by 366 days.

(21) Appl. No.: 12/771,793

(22) Filed: Apr. 30, 2010

(65) Prior Publication Data

US 2011/0270966 A1  Nov. 3, 2011

(51) Int. Cl.
*G06F 15/16* (2006.01)

(52) U.S. Cl.
USPC ............ 709/224; 709/223; 709/217; 709/218

(58) Field of Classification Search
USPC .......................................... 709/225, 226, 201
See application file for complete search history.

(56) References Cited

U.S. PATENT DOCUMENTS

| | | | |
|---|---|---|---|
| 5,559,958 A | 9/1996 | Farrand et al. | |
| 6,122,639 A | 9/2000 | Babu et al. | |
| 6,343,320 B1 | 1/2002 | Fairchild et al. | |
| 6,377,987 B1 | 4/2002 | Kracht | |
| 6,718,384 B2 | 4/2004 | Linzy | |
| 6,915,954 B2 | 7/2005 | Knowles et al. | |
| 6,918,541 B2 | 7/2005 | Knowles et al. | |
| 6,934,749 B1 | 8/2005 | Black et al. | |
| 7,020,697 B1 | 3/2006 | Goodman et al. | |
| 7,194,538 B1 | 3/2007 | Rabe et al. | |
| 7,200,122 B2 | 4/2007 | Goringe et al. | |
| 7,216,157 B1 | 5/2007 | Liu et al. | |
| 7,328,260 B1 | 2/2008 | Muthiyan et al. | |
| 7,401,338 B1 | 7/2008 | Bowen et al. | |
| 7,403,987 B1 | 7/2008 | Marinelli et al. | |
| 7,467,198 B2 | 12/2008 | Goodman et al. | |
| 7,506,040 B1 | 3/2009 | Rabe et al. | |
| 7,577,729 B1 | 8/2009 | Umbehocker et al. | |
| 7,769,735 B2 * | 8/2010 | Wasserman et al. | 707/705 |
| 2004/0088405 A1 * | 5/2004 | Aggarwal | 709/224 |
| 2005/0223264 A1 * | 10/2005 | Arden et al. | 714/4 |
| 2008/0098454 A1 * | 4/2008 | Toh | 726/1 |
| 2010/0131639 A1 * | 5/2010 | Narayana et al. | 709/224 |
| 2012/0011173 A1 * | 1/2012 | Ohata et al. | 707/812 |

OTHER PUBLICATIONS http://en.wikipedia.org/wiki/Simple_Network_Management_Protocol, "Simple Network Management Protocol," Jan. 21, 2010, 11 pages.

* cited by examiner

*Primary Examiner* — Djenane Bayard
(74) *Attorney, Agent, or Firm* — Shun Yao; Park, Vaughan, Fleming & Dowler LLP

(57) ABSTRACT

A management server uses one or more performance monitoring data collectors to generate SNMP queries. Each collector can be configured to specify one or more performance parameters. Using each configured collector, the management server can collect performance parameter data for managed devices in a network. When the management server receives performance data, the management server traverses through each response to look for performance values associated with each performance parameter. The management server can dynamically create and destroy performance monitoring instances supported by each collector to accommodate components added to or removed from the devices in the managed network.

22 Claims, 12 Drawing Sheets

DYNAMIC PERFORMANCE MONITORING

BACKGROUND

Computer networks often include and/or connect to a large number and variety of devices, including without limitation switches, routers, client workstations, servers, firewalls, concentrators, power supplies, etc. Furthermore, these devices are frequently designed and manufactured by different companies. Nevertheless, it is advantageous to manage and monitor the wide variety of devices using a central management station.

Simple Network Management Protocol (SNMP) is a UDP-based network protocol used to monitor network-attached devices for various operational characteristics. In one implementation, SNMP can be used to monitor performance of individual devices in a network, and more particularly, individual components of those devices. For example, SNMP can be used to monitor the temperature of a central processing unit (CPU) or the humidity within a computer chassis. However, as networks continue to scale in size, SNMP management of large, diverse networks requires onerous manual configuration operations—one performance monitoring data collector is manually configured for each individually monitored performance parameter on each monitored device or component thereof. Understandably, as networks continue to scale, the process of managing performance monitoring operations in such networks becomes overwhelming.

SUMMARY

Implementations described and claimed herein address the foregoing problems by configuring one or more performance monitoring data collectors in a management server. Each collector can be configured to specify performance parameter data for one or more performance parameters. Using each configured collector, a collection engine in the management server can collect performance parameter data for multiple devices in the managed network. To collect performance parameter data, each management server transmits performance monitoring queries to each managed device in the managed network. Each performance monitoring query corresponds to the one or more performance parameters associated with the collector. In one implementation, the management server polls each managed device to request performance values corresponding to individual performance parameters from each managed device. When the management server receives responses to these performance monitoring queries from the managed devices in the network, the collection engine in the management server traverses through each response to look for performance parameter data associated with specific performance parameters managed by each collector. If a response from a previously known component of a device is detected during the traversal, an instance of the performance parameter for that component updates its value with the performance value received from the device. If a response is detected from a component that had not previously been monitored (e.g., no corresponding performance monitoring instance currently exists), the management server creates a new instance to record the new performance value for the new device or component.

In this manner, the administrator can configure a management server with collectors associated with the performance parameters he or she is interested in monitoring, and the management server will query for the data associated with the one or more specific performance parameters associated with the collector. Further, the management server can dynamically create and destroy instances supported by each collector to accommodate components added to or removed from the devices in the managed network.

Other implementations are also described and recited herein.

BRIEF DESCRIPTIONS OF THE DRAWINGS

DETAILED DESCRIPTIONS

Figure 1:
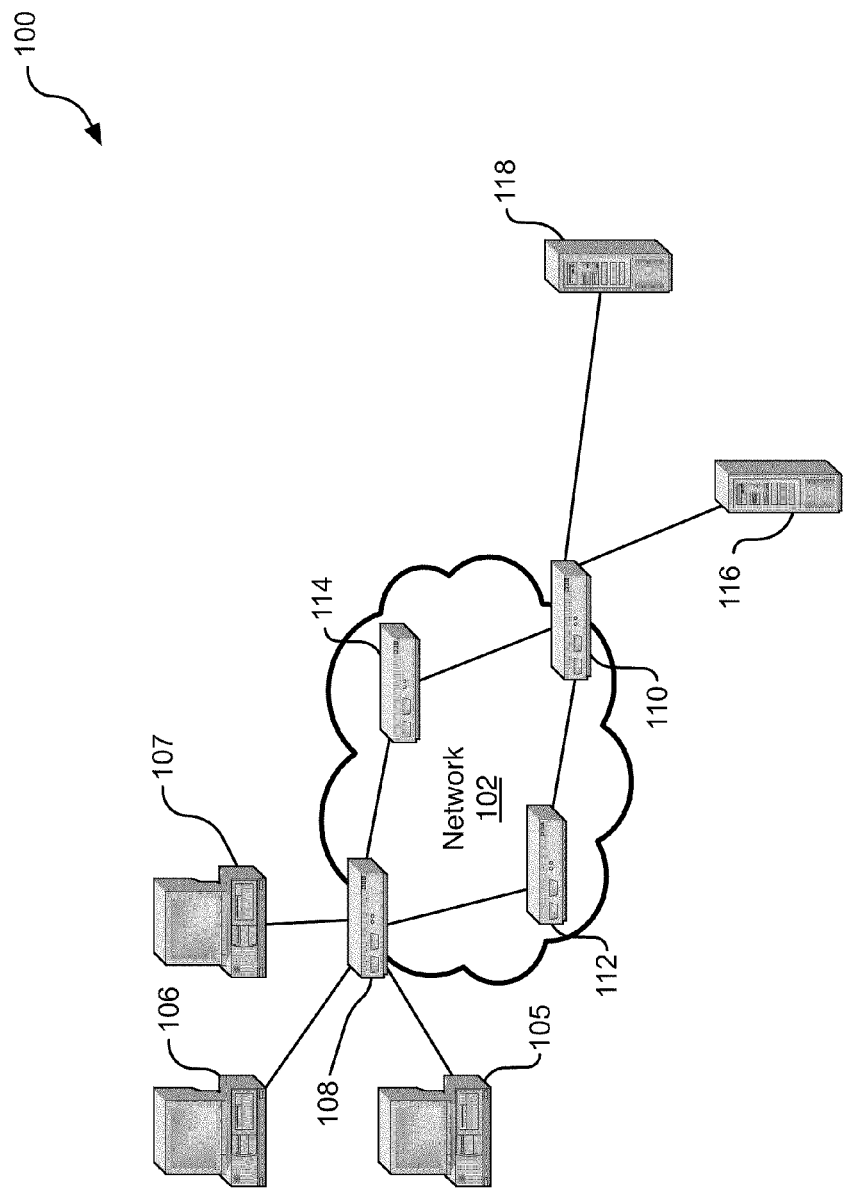
FIG. 1 illustrates an example topology of a managed network employing dynamic performance monitoring.

FIG. 1 illustrates an example topology of a managed network employing dynamic performance monitoring. As described, dynamic performance monitoring can be employed in various types of networks, including without limitation local area networks (LANs), storage area networks (SANs), and metropolitan area networks (MANs) and in networks employing a variety of wired and wireless networking protocols, such as Ethernet, Fibre Channel, Infiniband, etc.

As shown in FIG. 1, three client nodes 105, 106, and 107 connect to a network 102 via a switch 108. The network 102 can be Ethernet-based or employ another networking protocol, including both wired and wireless protocols. The switch 108 is connected within the network 102 to other switches 110, 112 and 114. The switch 110 then connects to servers 116 and 118. If the client node 106 communicates with the server 118, for example, to access an email server function, data packets would flow between the client node 106 and the server 118 (e.g., based on a source address of the client node 106 and the destination address of the server 118) through the switches in the network 102.

In the illustrated example, the server 116 represents a management server that manages the other devices connected to the network 102, including the client nodes 105, 106, and 107, the switches 108, 110, 112, and 114, and the server 118, although it should be understood that some of the devices connected to a network can be omitted from management. In one implementation, the management server 116 and each of the managed devices can execute a Simple Network Management Protocol (SNMP) management program, which allows the management server 116 to transmit performance data queries to and receive performance data responses from the managed devices. For example, the server may be configured to respond to an appropriate performance monitoring query from the management server 116 with monitored temperatures within the devices (e.g., the temperatures of the CPU, of the memory, of the hard drive, etc.).

More specifically, in an SNMP configuration, the management server 116 is referred to as the "manager" and the individual managed devices are referred to as "agents". The manager and the agents communicate according to one or more network communication protocols, such as Transmission Control Protocol/Internet Protocol (TCP/IP). For example, various SNMP queries and responses may be encoded in the IP and TCP header fields of data frames communicated between the management server 116 and each managed device.

SNMP does not define specific performance parameters that a manage device should support. Instead, SNMP employs an extensible design that defines available information in a management information base (MIB). An MIB describes the structure of the management data made available by an individual device and/or its components. An MIB exposes a hierarchical namespace containing object identifiers (OIDs), each of which identifies an MIB object that can be managed via SNMP. A managed object or performance monitoring object (e.g., an MIB object) represents one or more specific performance parameters (e.g., status, temperature, amount of available storage, etc.) monitored by a management server and supported by managed devices. For example, a health check collector may manage MIB objects for multiple performance values, such as snChasPwrSupplyOperStatus, snChasFanOperStatus, snAgentTempValue, etc.

Managed objects or performance management objects (e.g., MIB objects) are identified by their OIDs and can be instantiated as one or more performance monitoring instances (e.g., MIB instances). Each MIB instance is configured to store data for an individual performance parameter for a single component. Accordingly, each MIB instance is capable of storing one or more values representing performance parameter data of the associated component. A performance parameter corresponds to a performance monitoring object and represents a type of performance measure managed by a management server. A performance value corresponds to a performance monitoring instance represents a value of a performance measure reported by a device or component In contrast to traditional approaches, in which an administrator configures the management server with a collector for each performance parameter for each managed device, the technology described herein provides a collector capable of managing multiple MIB objects, each MIB object corresponding to a distinct performance parameter for multiple devices on a managed network. Accordingly, an administrator configures a collector for one or more performance parameters (e.g., status, temperature, etc.), the collector causes the management server to issue queries requesting that managed devices report their performance parameter data corresponding to the performance parameters of the collector, and the collector dynamically updates performance monitoring instances for each device or component that responds, creating new performance monitoring instances for newly added devices and removing performance monitoring instances for recently removed devices.

Figure 2:
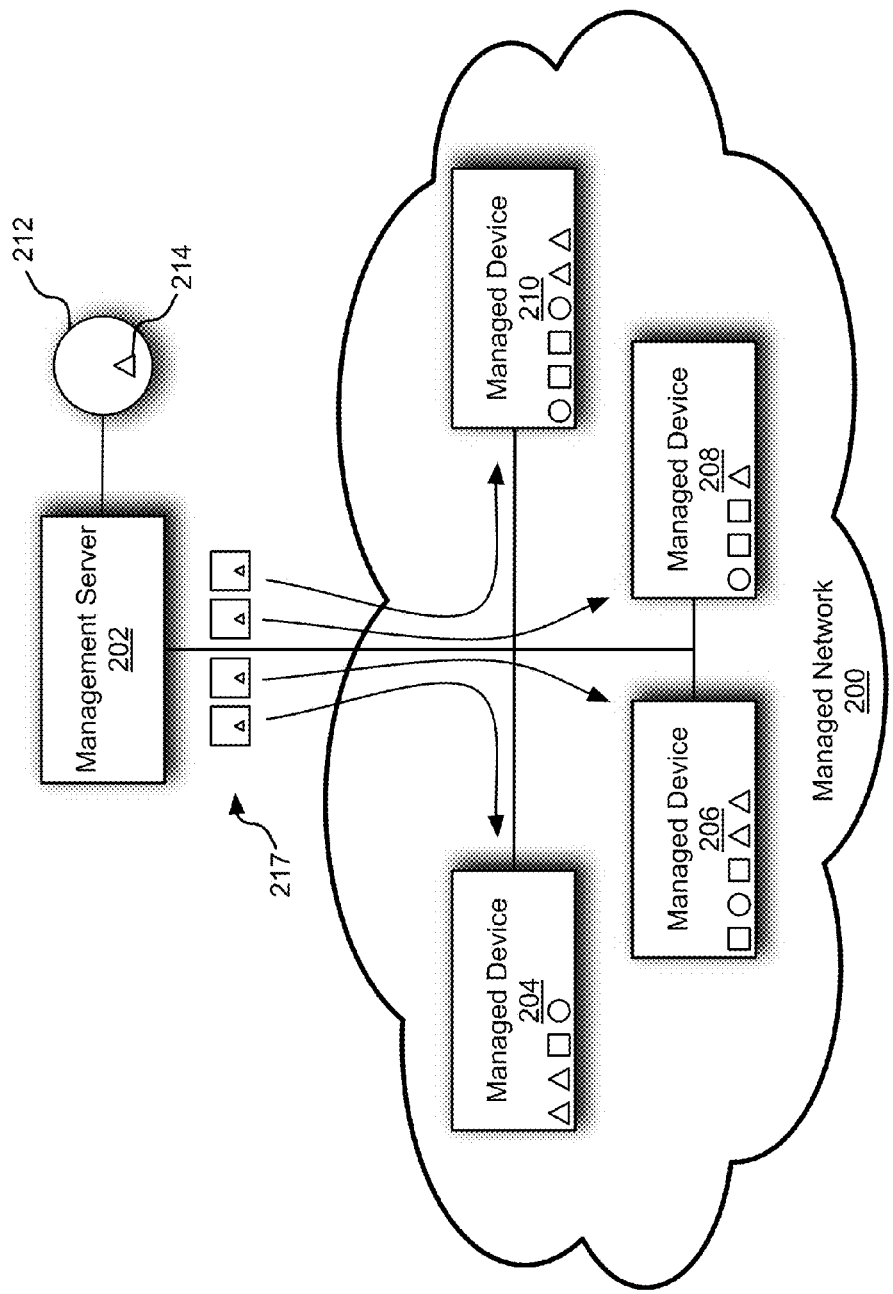
FIG. 2 illustrates an example managed network in which a management server queries multiple managed devices in the network.

FIG. 2 illustrates an example managed network 200 in which a management server 202 queries multiple managed devices 204, 206, 208, and 210 in the network 200. The management server 202 maintains a collector datastore 212 including one or more configured collectors. For the purpose of illustrating different performance parameters in FIG. 2, each performance parameter (or corresponding MIB object) is designated by a shape: square, triangle, and circle. For example, an MIB object designated by a triangle may correspond to CPU temperature while an MIB object designated by a square may correspond to available storage space on a hard drive. These performance parameters are merely provided as examples. The use of symbols to represent performance parameters will be used to demonstrate the various devices, processes, and communications relating to one or more of the performance parameters. In FIG. 2, the collector datastore 212 includes a collector 214 associated with the triangle performance parameter.

Each managed device 204, 206, 208, and 210 in the network 200 is shown has having devices and components supporting multiple performance parameters. The managed device 204 includes components that support four distinct performance monitoring instances: two associated with the triangle MIB object, one associated with the square MIB object, and one associated with the circle MIB object. For example, the managed device 204 is configured to include two CPUs reporting their operating temperatures ("triangle"), one hard disc drive reporting its available storage space ("square"), and one network interface reporting its data traffic ("circle"). In comparison, the managed device 206 is configured to include two CPUs their operating temperatures ("triangle"), two hard disc drives reporting their available storage space ("square"), and one network interface reporting its data traffic ("circle").

A single collector may be configured to manage one or more MIB objects. As shown in FIG. 2, the collector 214 is configured to manage one particular MIB object, which is designated by a triangle symbol. Further, the collector 214 is configured to manage one or more instances of the MIB object representing the corresponding performance parameter. For example, based on the managed network 200 shown in FIG. 2, the collector 214 has created and manages seven instances of the triangle MIB object corresponding to the triangle performance parameter, one instance for each performance value reported by a device or component thereof reporting from the managed network 200.

Periodically, the management server 202, based on the collector 214, issues one or more management queries 217 associated with the "triangle" performance parameter to query the managed devices in the managed network 200, each of which will respond with its own performance data ("performance values") associated with the "triangle" performance parameter. As shown, the management server 202 issues one SNMP query for each managed device. Accordingly, each collector specifies the performance parameters it is monitoring and receives all available performance values for those performance parameters that are available from the managed devices in the network 200.

Figure 3:
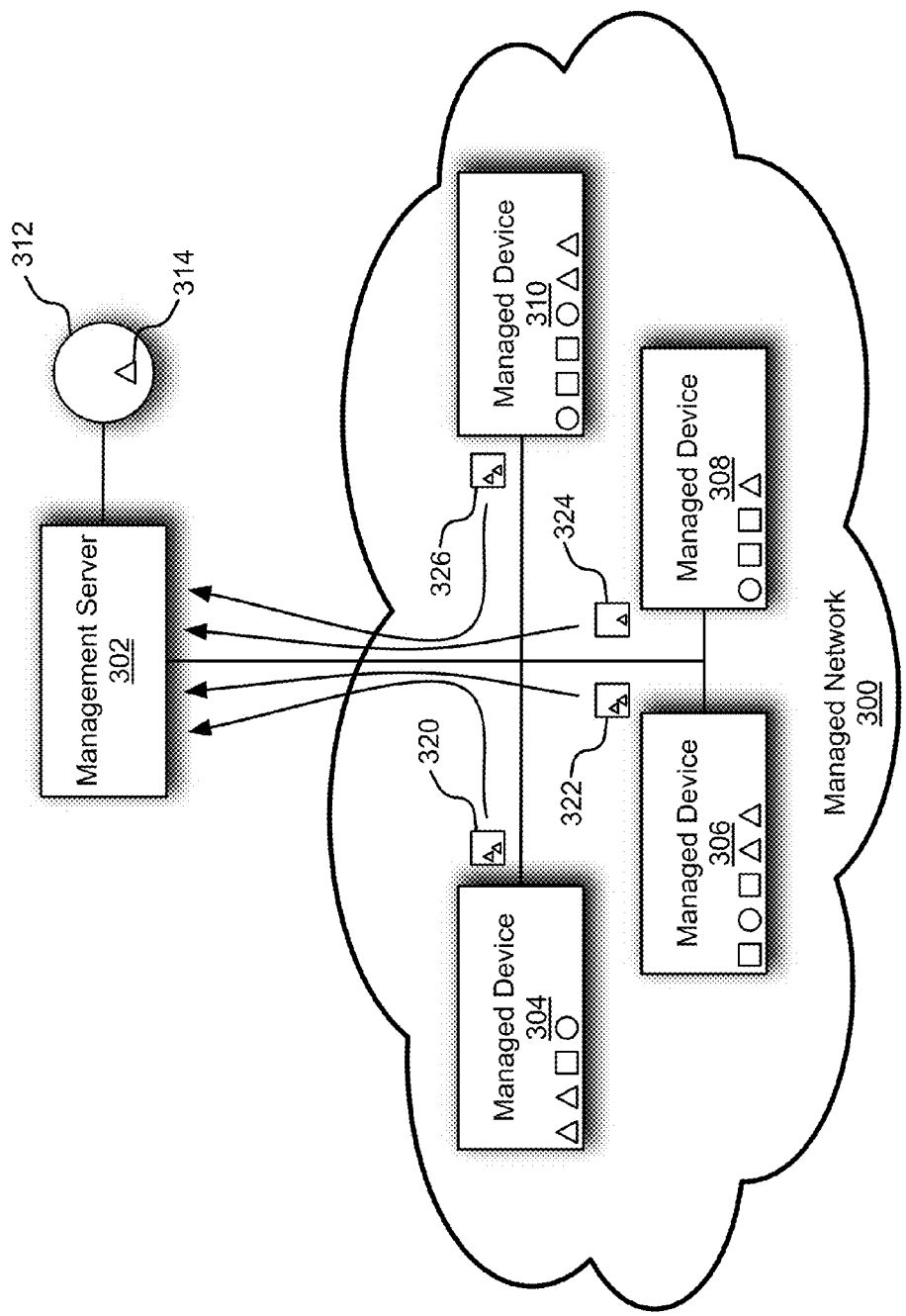
FIG. 3 illustrates an example managed network in which a management server receives responses from multiple managed devices in the network.

FIG. 3 illustrates an example managed network 300 in which a management server 302 receives responses 320, 322, 324, and 326 from multiple managed devices 304, 306, 308, and 310 in the network 300. As previously shown in FIG. 2, the management server 302 maintains a collector datastore 312 including a collector 314 associated with the triangle performance parameter.

Each managed device 304, 306, 308, and 310 in the network 300 is shown has having devices including components that support multiple performance parameters. For example, the managed device 304 supports four distinct performance parameter instances: two associated with the triangle MIB object, one associated with the square MIB object, and one associated with the circle MIB object.

Upon receiving the management server's query from FIG. 2, each managed device responds with its performance values associated with the triangle performance parameter specified in the query. In one implementation, each response includes without limitation at least one OID associated with the responding MIB object of the queried performance parameter, a device/component identifier, and at least one performance value associated with the performance parameter. For example, the managed device 304 received the query and returns a response 320 containing the performance parameter data relating to its triangle performance parameters (e.g., the temperatures of its two CPUs). The managed device 306 receives the query and returns a response 322 containing the performance values relating to its triangle performance parameters (e.g., the temperatures of its two CPUs). The managed device 308 receives the query and returns a response 324 containing the performance values relating to its triangle performance parameter (e.g., the temperature of its single CPU). The managed device 310 received the query and returns a response 326 containing the performance values relating to its triangle performance parameters (e.g., the temperatures of its two CPUs).

The management server 302 receives the responses 320, 322, 324, and 326 and passes them into a hierarchical data structure associated with the collector 314 for processing. The management server 302 traverses the hierarchical data structure looking for performance values associated with the triangle performance parameter. Each performance value is marked with the OID associated with the triangle MIB object and an identifier of the corresponding target device. When the management server 302 detects the triangle OID, it examines the associated hierarchical data structure record to extract the target device or component identifier and the performance value.

If the management server 302 had previously created an MIB instance associated with the identified component for the triangle MIB object, the management server 302 updates the MIB instance with the performance value from the hierarchical data structure. If the management server 302 does not currently maintain an MIB instance associated with the identified OID and target device, the management server 302 creates a new MIB instance for the identified component and initializes its value using the performance value from the hierarchical data structure. In this manner, the management server 302 dynamically adds new MIB instances automatically for new components added to the managed network 300.

If the management server 302 determines that a component for which it had previously created an MIB instance did not respond to the query, the management server 302 may delete the abandoned MIB instance. In one implementation, the management server 302 marks the MIB instance as abandoned (e.g., graying out the display associated with the MIB instance). Further, the management server 302 may wait (e.g., a specified period of time, a specified number of queries not responded to, etc.) before determining that the abandoned MIB instance is truly abandoned therefore deleting it. In this manner, the management server 302 dynamically deletes old MIB instances automatically for new components removed from the managed network 300.

Figure 4:
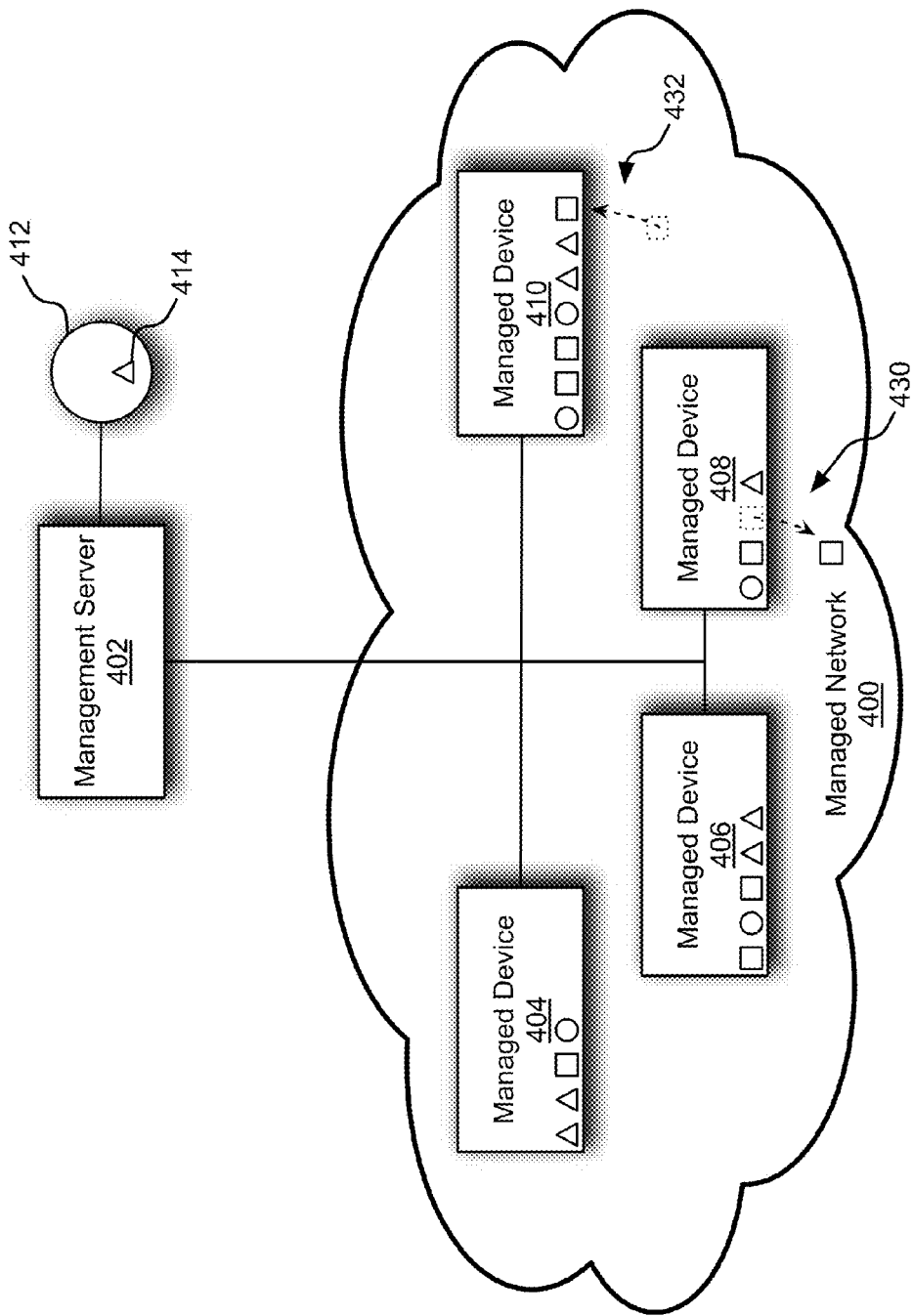
FIG. 4 illustrates an example managed network in which the configurations of two of the managed devices are modified.

FIG. 4 illustrates an example managed network 400 in which the configuration of two of the managed devices 408 and 410 are modified. As previously shown in FIG. 3, the management server 402 maintains a collector datastore 412 including a collector 414 associated with the triangle performance parameter.

Each managed device 404, 406, 408, and 410 in the network 400 is shown has having components supporting multiple performance parameters. In contrast to the managed devices of FIG. 3, an administrator has removed a hard disc drive from the managed device 408 (as shown generally by arrow 430) and has added a hard disc drive to the managed device 410 (as shown generally by arrow 432).

Figure 5:
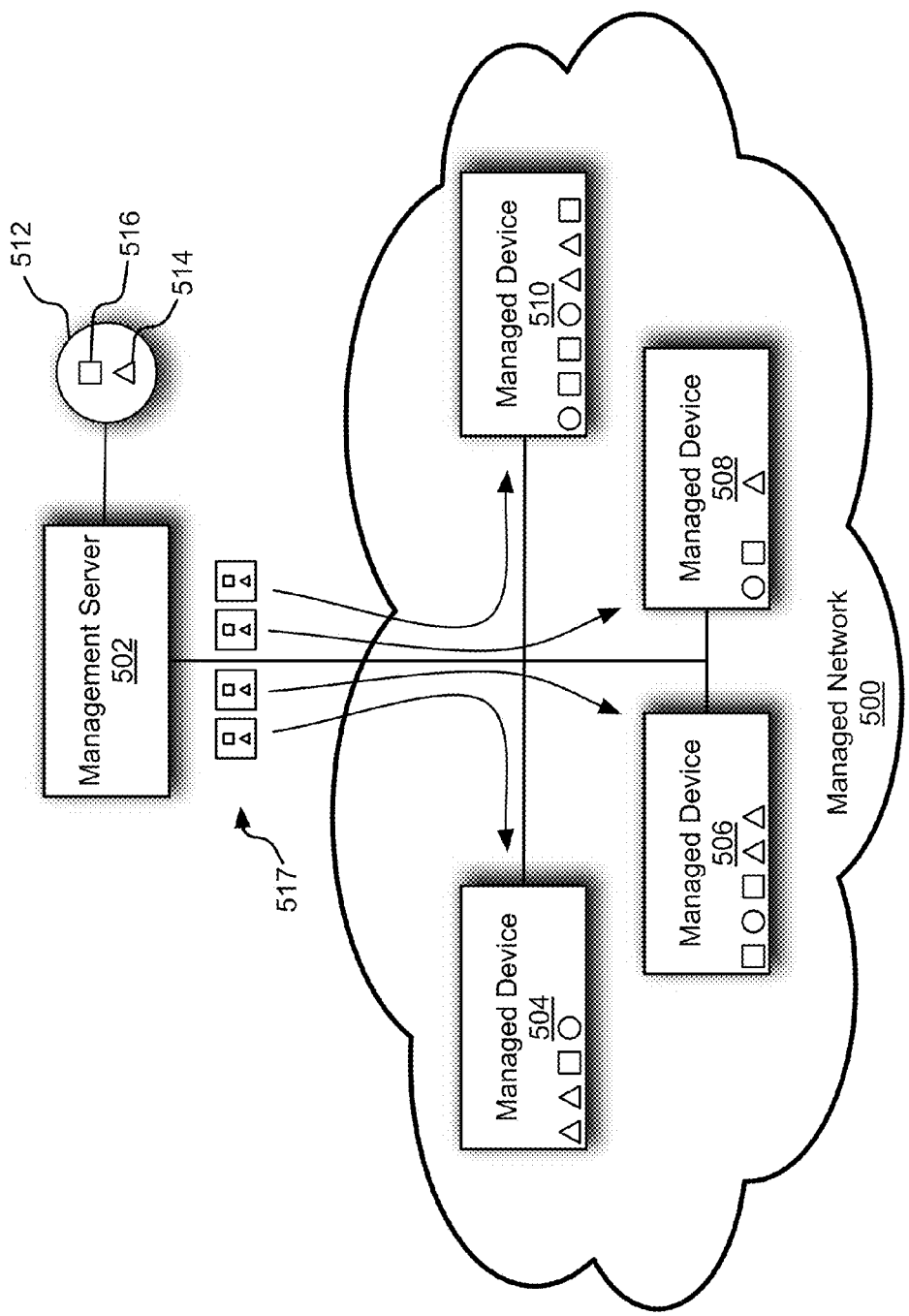
FIG. 5 illustrates an example managed network in which a management server queries multiple (modified) managed devices in the network.

FIG. 5 illustrates an example managed network 500 in which a management server 502 queries multiple (modified) managed devices 504, 506, 508, and 510 in the network 500. The management server 502 maintains a collector datastore 512 including a collector 514 associated with the triangle performance parameter and a new collector 516 associated with the square performance parameter, the latter of which has been added by an administrator as compared to FIG. 2.

Each managed device 504, 506, 508, and 510 in the network 500 is shown has having components supporting multiple performance parameters. Periodically, the management server 502 issues one or more management queries 517 (associated with the "triangle" and "square" performance parameters) to query the managed devices in the managed network 500, each of which will respond with its own performance values associated with the "triangle" and/or "square" performance parameters. Accordingly, each collector specifies the performance parameter it is monitoring and receives all available performance data for the performance parameter that is available from the managed devices in the network 500. It should be understood that if any managed device does not support a queried performance parameter, then the device simply does not need to respond to that query.

Figure 6:
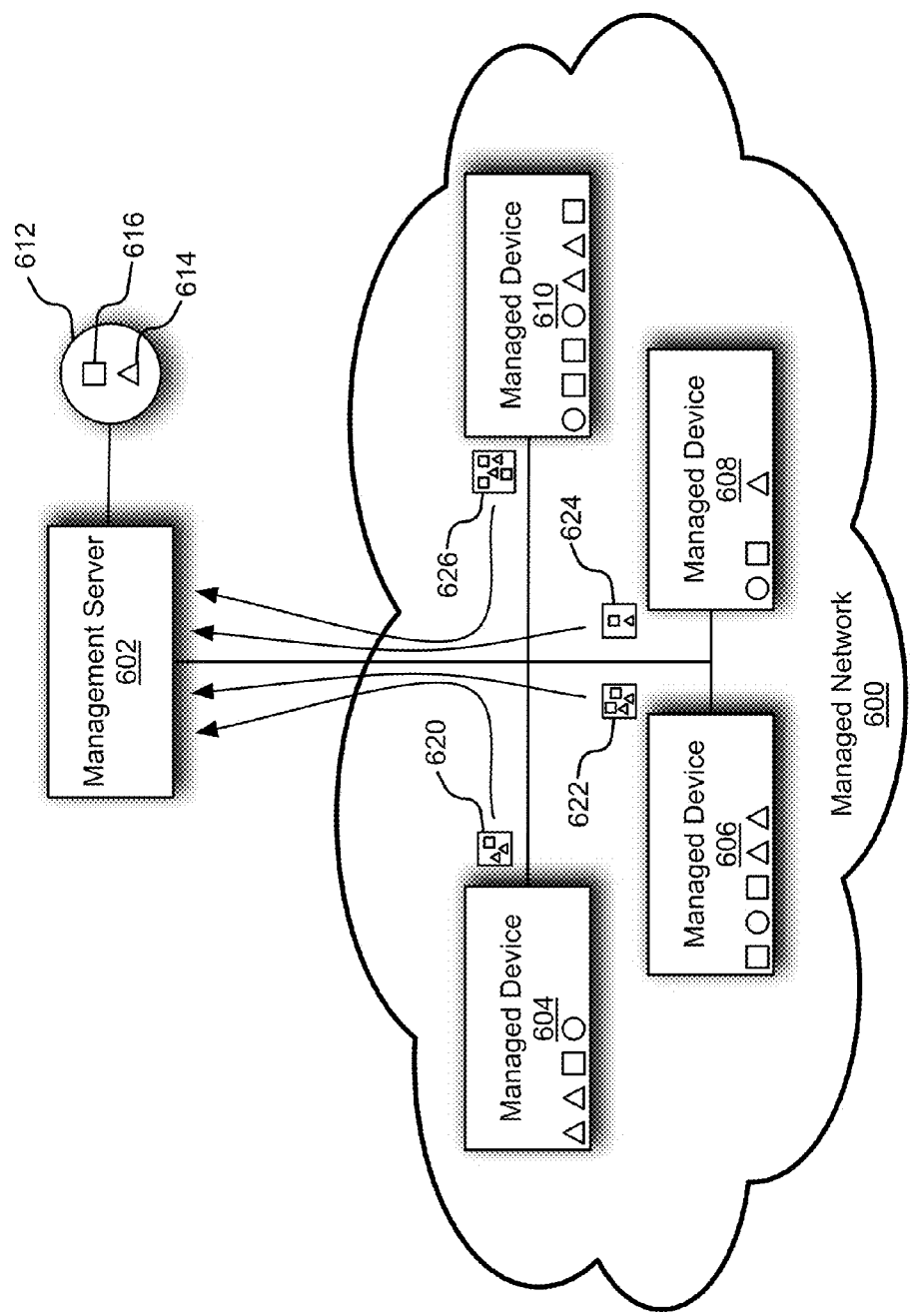
FIG. 6 illustrates an example managed network in which a management server receives responses from multiple (modified) managed devices in the network.

FIG. 6 illustrates an example managed network 600 in which a management server 602 receives responses 620, 622, 624, and 626 from multiple (modified) managed devices 604, 606, 608, and 610 in the network 600. As previously shown in FIG. 5, the management server 602 maintains a collector datastore 612 including a collector 614 associated with the triangle performance parameter and a collector 616 associated with the square performance parameter.

Each managed device 604, 606, 608, and 610 in the network 600 is shown has having components supporting multiple performance parameters. Upon receiving the management server's query from FIG. 5, each managed device responds with its performance parameter values associated with the triangle and square performance parameters specified in the query. In one implementation, each response includes without limitation at least one OID associated with the responding MIB object of the queried performance parameter, a device/component identifier, and at least one performance parameter data value.

For example, the managed device 604 received the query and returns a response 620 containing the performance values relating to its triangle performance parameters (e.g., the temperatures of its two CPUs) and to its square performance parameters (e.g., the amount of available disc space on its two storage discs). The managed device 606 receives the query and returns a response 622 containing the performance values relating to its triangle performance parameters (e.g., the temperatures of its two CPUs) and to its square performance parameters (e.g., the amount of available disc space on its two storage discs). The managed device 608 receives the query and returns a response 624 containing the performance values relating to its triangle performance parameter (e.g., the temperature of its single CPU) and to its square performance parameter (e.g., the amount of available disc space on its single storage disc). The managed device 610 received the query and returns a response 626 containing the performance values relating to its triangle performance parameters (e.g., the temperatures of its two CPUs) and to its square performance parameters (e.g., the amount of available disc space on its three storage discs).

The management server 602 receives the responses 620, 622, 624, and 626 and passes them into a hierarchical data structure associated with the collectors 614 and 616 for processing. The management server 602 traverses the hierarchical data structure looking for performance parameter data associated with the triangle performance parameter. Such performance parameter data is marked with the OID associated with the triangle or square MIB objects. When the management server 602 detects the triangle OID or the square OID, it examines the associated data structure record to extract the device or component identifier and the value.

If the management server 602 had previously created an MIB instance associated with the identified performance monitoring value, OID, and target device identifier, the management server 602 updates the corresponding MIB instance with the performance value from the hierarchical data structure. If the management server 602 does not currently maintain an MIB instance associated with the identified performance monitoring value, OID, and target device identifier, the management server 602 creates a new MIB instance for the identified component and initializes its value using the performance value from the hierarchical data structure. In this manner, the management server 602 dynamically adds new MIB instances automatically for new devices and components added to the managed network 600.

If the management server 602 determines that a component for which it had previously created an MIB instance did not respond to the query, the management server 602 may delete the abandoned MIB instance. In one implementation, the management server 602 marks the MIB object as abandoned (e.g., graying out the display associated with the MIB instance). Further, the management server 602 may wait (e.g., a specified period of time, a specified number of queries not responded to, etc.) before determining that the abandoned MIB instance is truly abandoned therefore deleting it. In this manner, the management server 602 dynamically deletes old MIB object instances automatically for components removed from the managed network 600 or otherwise disabled.

Figure 7:
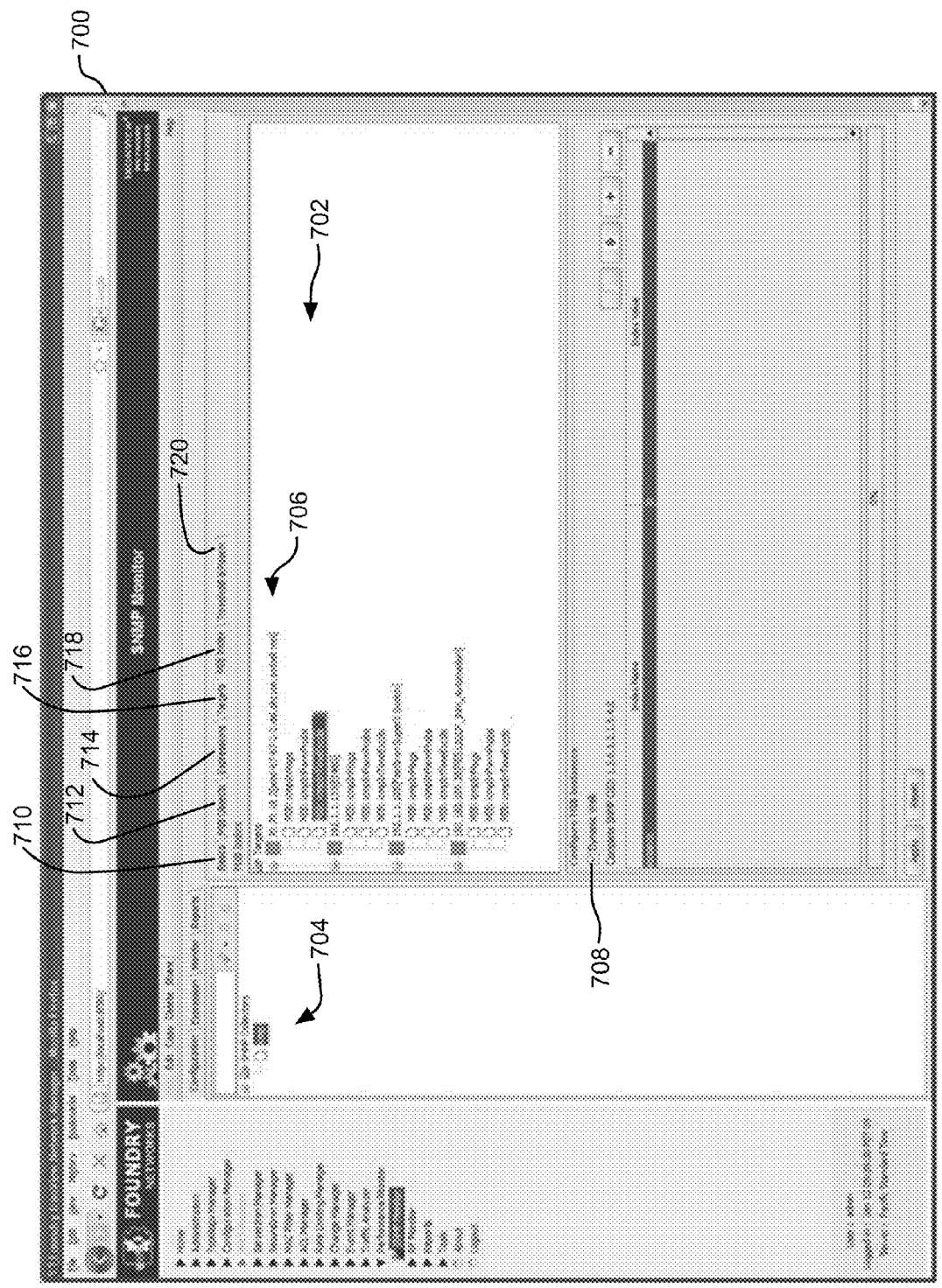
FIG. 7 illustrates an example screenshot of an SNMP monitor user interface using information collected by a management server and displaying a hierarchical list of devices and MIB objects.

FIG. 7 illustrates an example screenshot 700 of an SNMP monitor user interface using information collected by a management server and displaying a hierarchical list 702 of target devices and MIB objects. The list 704 of SNMP collectors identifies the collectors configured by the administrator to monitor specific performance parameters of the managed devices. For example, the "icmp" collector identified in the list 704 designates three MIB objects: icmpInMsgs, icmpInParmProbs, and icmpInTimeExcds (as shown in the hierarchical list 702). Other collectors may also be defined to manage other combinations of performance parameters.

During polling, the management server sends SNMP queries to the target devices that it manages. The SNMP queries specify the OIDs of the MIB objects attributed to the collector configured in the collector datastore of the management server. Each target device responds with performance values that it maintains in correspondence with the OID of the MIB object. For example, if a target device has one or more components that report performance values for the icmpInMsgs MIB object, the target device will respond to the SNMP query for the icmpInMsgs MIB object with performance values for those components.

Under the MIB Index tab 718, the hierarchical list 702 lists the target devices known to the collector (see the element 706 and the other higher level elements representing the target devices). For each target device, the MIB objects defined in the collector are also listed. As a result, the management server polls the four target devices for the performance values associated with each of the three MIB objects listed in the list 702.

The screenshot 700 also includes a Dynamic Walk control 708, shown as selected in FIG. 7. By selecting the Dynamic Walk control 708, the management server traverses through the SNMP responses it receives, updates the performance values for MIB instances it has already detected, creates new MIB instances for any newly detected components, and eventually deletes MIB instances for any removed or disabled components.

The screenshot 700 also shows other tabs that present different views and different data than the MIB Index tab. Because the Dynamic Walk control is selected, the MIB objects are listed without designation of an index (i.e., the individual instances are not defined by the collector but by virtue of the dynamic walk through SNMP responses from the collector).

The Basics tab 710 presents various properties associated with the selected collector. The MIB Objects tab 712 presents a view of the MIB objects associated with the selected collector (e.g., a listing of the three MIB objects icmpInMsgs, icmpInParmProbs, and icmpInTimeExcds associated with the icmp collector).

The Expressions tab 714 presents access to functionality allowing the administrator to define expressions of different MIB instances, such that a current value of one performance parameter of one component can be mathematically or logically combined in an expression to with another performance value to yield a new computed value. For example, an administrator may wish to define a new value equaling the total amount of traffic flowing through all of the ports of a particular target device. The Targets tab 716 presents a view of the target devices associated with the selected collector (e.g., a listing of the four target devices 70.70.18.2, 192.1.1.133, 192.1.1.105, and 180.180.180.20). The Threshold and Rearm tab 720 presents access to a value range for individual MIB objects or instances. For example, an administrator may set a threshold, above which an alarm or action is triggered, and a rearm level, below which the alarm is reset or another action is triggered.

Figure 8:
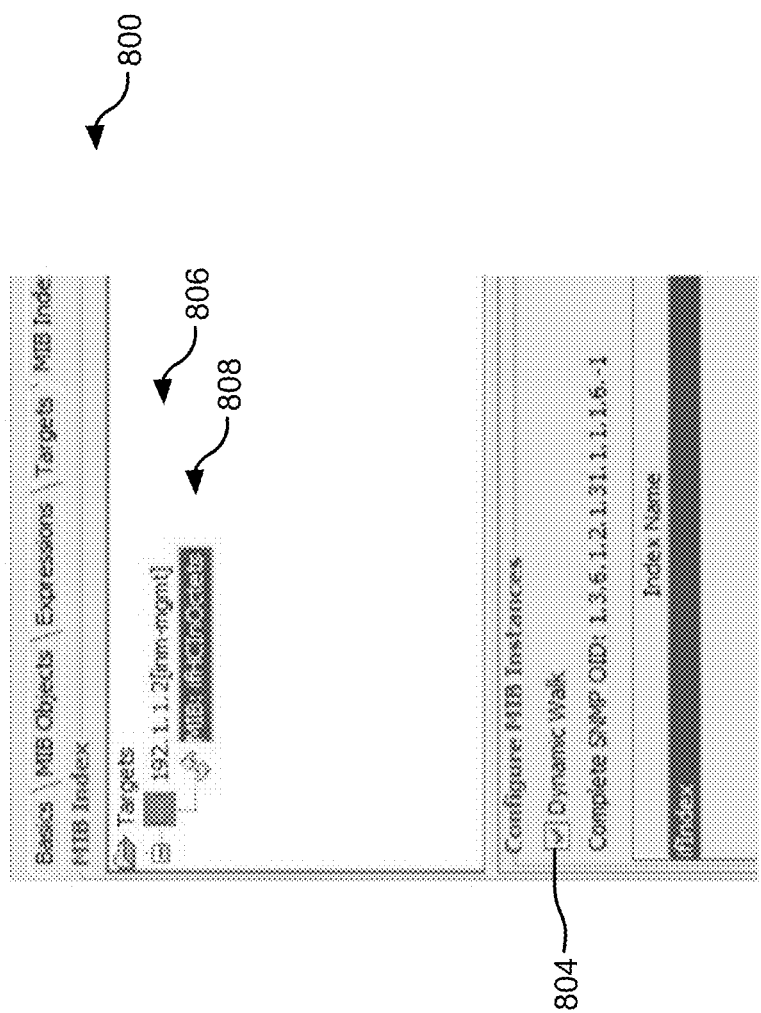
FIG. 8 illustrates an example screenshot portion of an SNMP monitor user interface using information collected by a management server.

FIG. 8 illustrates an example screenshot portion 800 of an SNMP monitor user interface using information collected by a management server. The Dynamic Walk control 808 is shown as selected. The target device ("192.1.1.2 [inm-mgmt]", which represents the device address and name) is listed at 806, and the MIB object ifHCInOctets is listed at 808 with a symbol indicating that its MIB instances were created, populated, and deleted on the basis of a dynamic walk through the performance data the management server received from managed devices. In one implementation, the management server traverses the entries in a hierarchical datastore of performance data and determines whether the MIB instance exists based on the devices and MIB objects designated in a collector. For example, if the management server does not already maintain an MIB instance of the if HCInOctets MIB object for target device 192.1.1.2 but has received performance data for that MIB object and that target device in a response, then the management server creates a new MIB instance in association with the target device and initializes the MIB instance with the performance value received.

Figure 9:
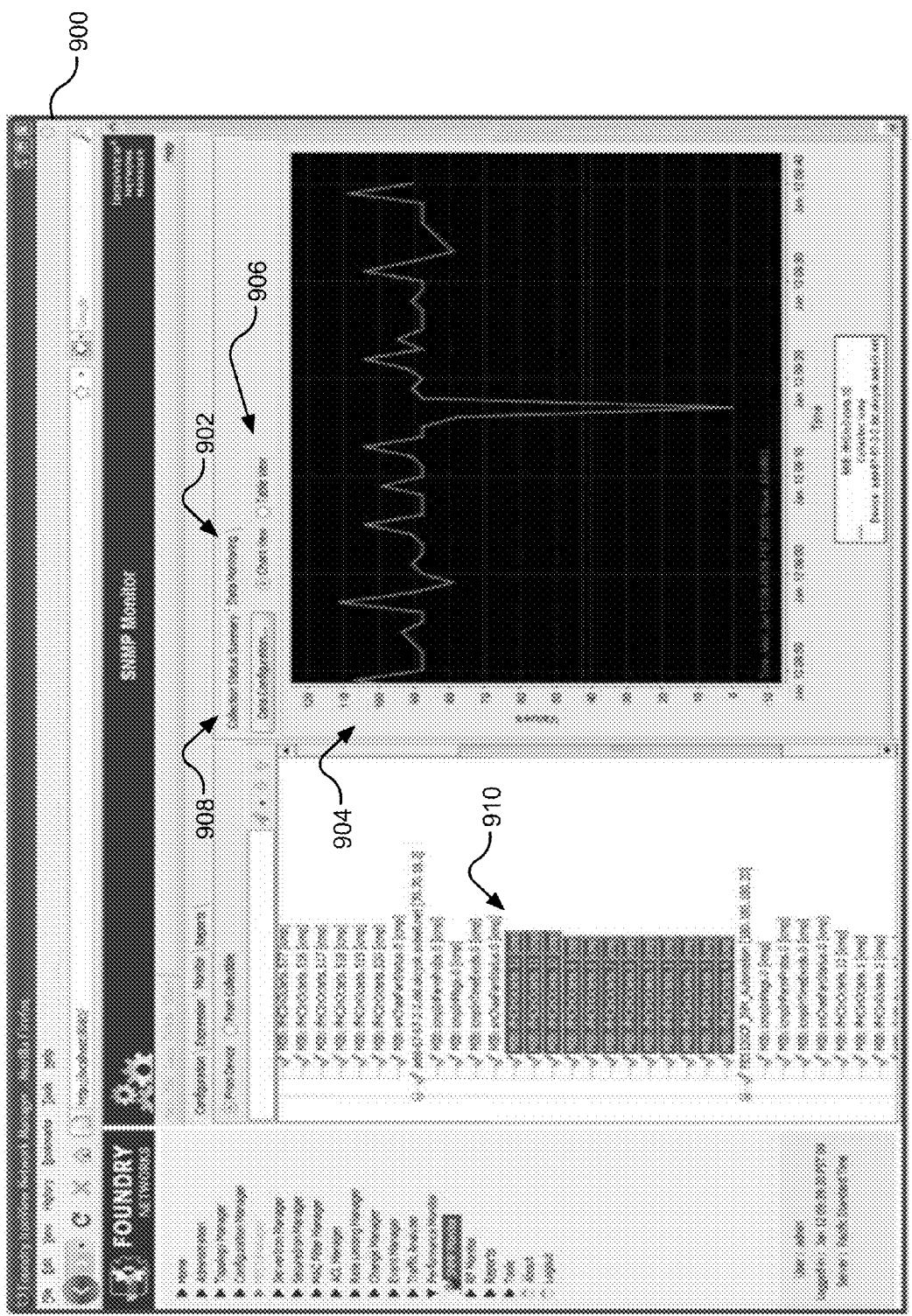
FIG. 9 illustrates an example screenshot of an SNMP monitor user interface using information collected by a management server and displaying historical performance data.

FIG. 9 illustrates an example screenshot 900 of an SNMP monitor user interface using information collected by a management server and displaying historical performance data. A Data Monitoring tab 902 displays historical performance data pertaining to MIB object if HCInOctets and device adsl-67-67-2-2.dsl.okcyok.swbell.net (at address 70.70.18.2). The historical performance parameter data is viewable as a graphical chart (as shown in 904) or in a table view, based on the selection of controls 906. The graphical chart 904 presents the historical performance data for one of the MIB instances listed in the hierarchical list to the left of the graphical chart 904 (i.e., iHCInOctets.10 of target device adsl-67-67-2-2.dsl.okcyok.swbell.net at address 70.70.18.2). A snapshot of the performance parameter data is also available under the Collection Status Summary tab 908, as shown in FIG. 10.

The hierarchical list to the left of the graphical chart 904 includes a list of the MIB objects reported by the target device, including selected MIB instances 910. Each MIB instance is indexed relative to other MIB instances associated with a particular MIB object and target device. In this screenshot 900, the administrator has selected all of the all of the MIB instances of a particular MIB object, iHCInOctets to monitor the performance of the twelve network interfaces associated with MIB instances (e.g., to monitor traffic through the interfaces).

Figure 10:
FIG. 10 illustrates an example screenshot of an SNMP monitor user interface using information collected by a management server and displaying a snapshot of performance data.

FIG. 10 illustrates an example screenshot 1000 of an SNMP monitor user interface using information collected by a management server and displaying a snapshot of performance parameter data. The snapshot entry 1002 illustrates a target device named inm-mgmt at address 192.1.1.2, monitored by an MIB object entitled if HCInOctets. A collector named "test" designates the MIB object for management by the management server. The most recent performance value received from the target device for the MIB object is displayed: 122.0167.

The hierarchical list to the left of the snapshot portion of the screenshot 1000 shows fourteen grayed out MIB objects. The grayed-out MIB instances 1004 indicate that the inm-mgmt device has ceased reporting performance data for those MIB objects, as discovered by the dynamic walk by the management server. For example, the components associated with the grayed out MIB instances 1004 may have been removed from the target device or otherwise disabled. Accordingly, after a period of time, the grayed out MIB instances 1004 will be deleted from the display.

Figure 11:
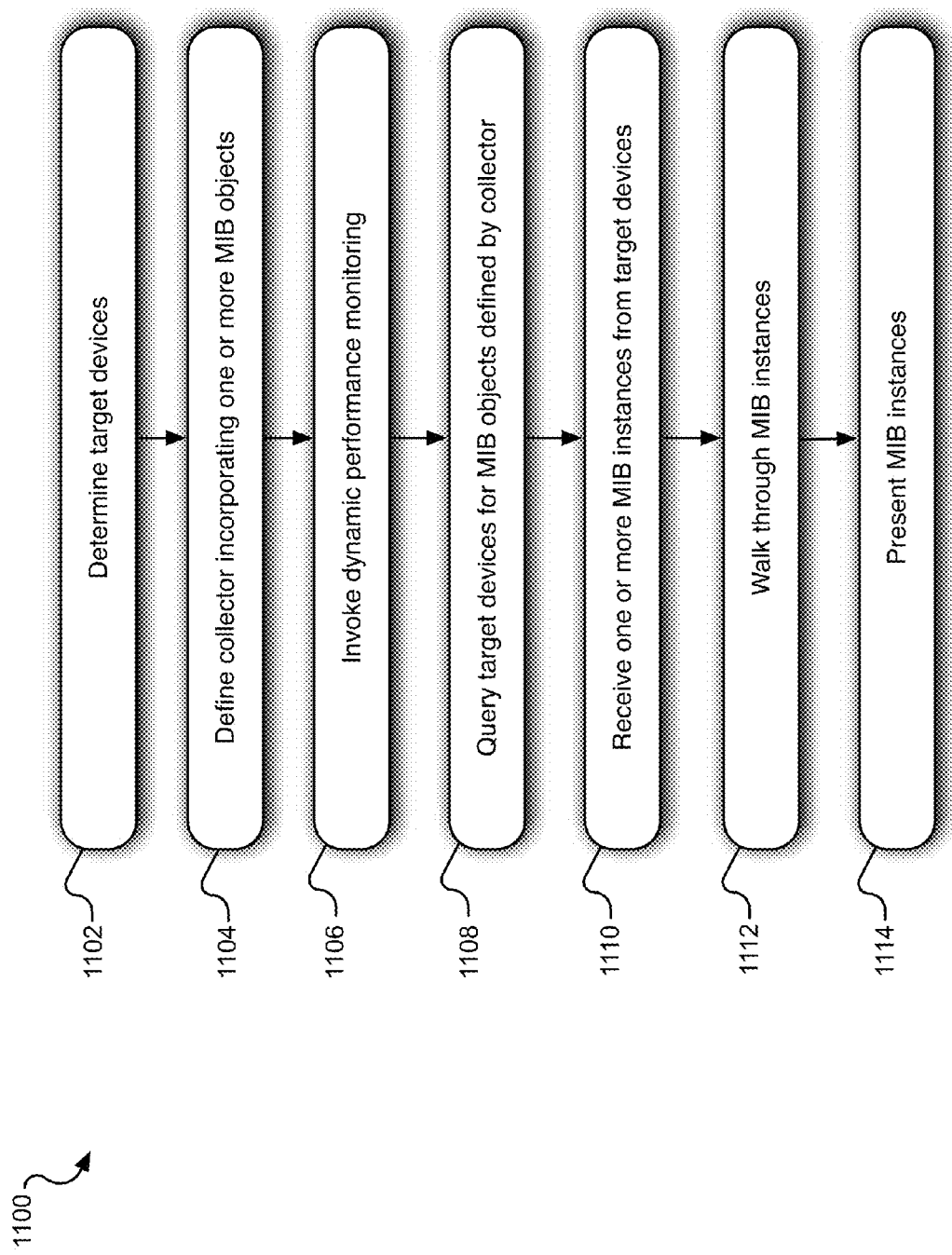
FIG. 11 illustrates example operations for presenting dynamic performance monitoring results.

FIG. 11 illustrates example operations 1100 for presenting dynamic performance monitoring results. A targeting operation 1102 determines the target devices managed on a network by the dynamic performance monitoring. In one implementation, the target devices may be auto-discovered and have their identifiers (e.g., addresses) entered into a target device datastore (e.g., a database). Alternatively, the identifiers of the target devices may be manually entered into a target device datastore or imported from a configuration file or data stream. A collector operation 1104 defines a collector that incorporates one or more MIB objects. For example, an administrator can create a collector and identify one or more MIB objects associated with the collector.

An invocation operation 1106 invokes dynamic performance monitoring (e.g., by selecting a Dynamic Walk setting in a user interface). The invocation operation 1106 causes the management server to periodically query the determined target devices according to MIB objects defined by the collector (e.g., in querying operation 1108). For example, if the collector is defined to monitor icmpInMsgs, icmpInParamPros, and icmpInTimeExcds, the management server transmits SNMP queries (e.g., performance monitoring queries) to the target devices requesting current value of data associated with these three performance parameters. It should be understood that the SNMP queries need not identify a particular performance monitoring instance or device component, as an SNMP query requests from each target device performance data relating to a specified performance parameter and expects all reporting components to response with updated performance values. As such, identification of a specific performance instance may be omitted from each performance monitoring query.

In response to the querying operation 1108, individual target devices within the network transmit data pertaining to their individual managed components that support these MIB objects. For example, if a target device includes four components that support the icmpInMsgs MIB object, then all four components will response with current performance values relating to this performance parameter. Each component responding with a current performance value associated with the MIB object identified in the SNMP query corresponds to an MIB instance associated with the corresponding performance parameter. It should also be understood that a component may be disabled within a target device, in which case the disabled component would not respond to the SNMP query while other enabled components would respond accordingly. Likewise, if a target device does not include any components supporting a queried MIB object, then that target device would not respond with current values corresponding to that performance parameter.

A receiving operation 1110 receives one or more performance values from various target devices. Dynamic walking logic of the management server collects the received values and traverses through them in a walking operation 1112. During this traversal through the received performance values, the management server identifies values associated with MIB objects configured for a particular collector and creates an MIB instance of that MIB object in association with that collector. A presenting operation 1114 presents the MIB objects in association with the collector (e.g., displaying the MIB instance in a tree under the collector). In this manner, the management server automatically creates MIB instances for the components of the target devices that responded to the SNMP query defined by the individual collector and its designated MIB objects.

Figure 12:
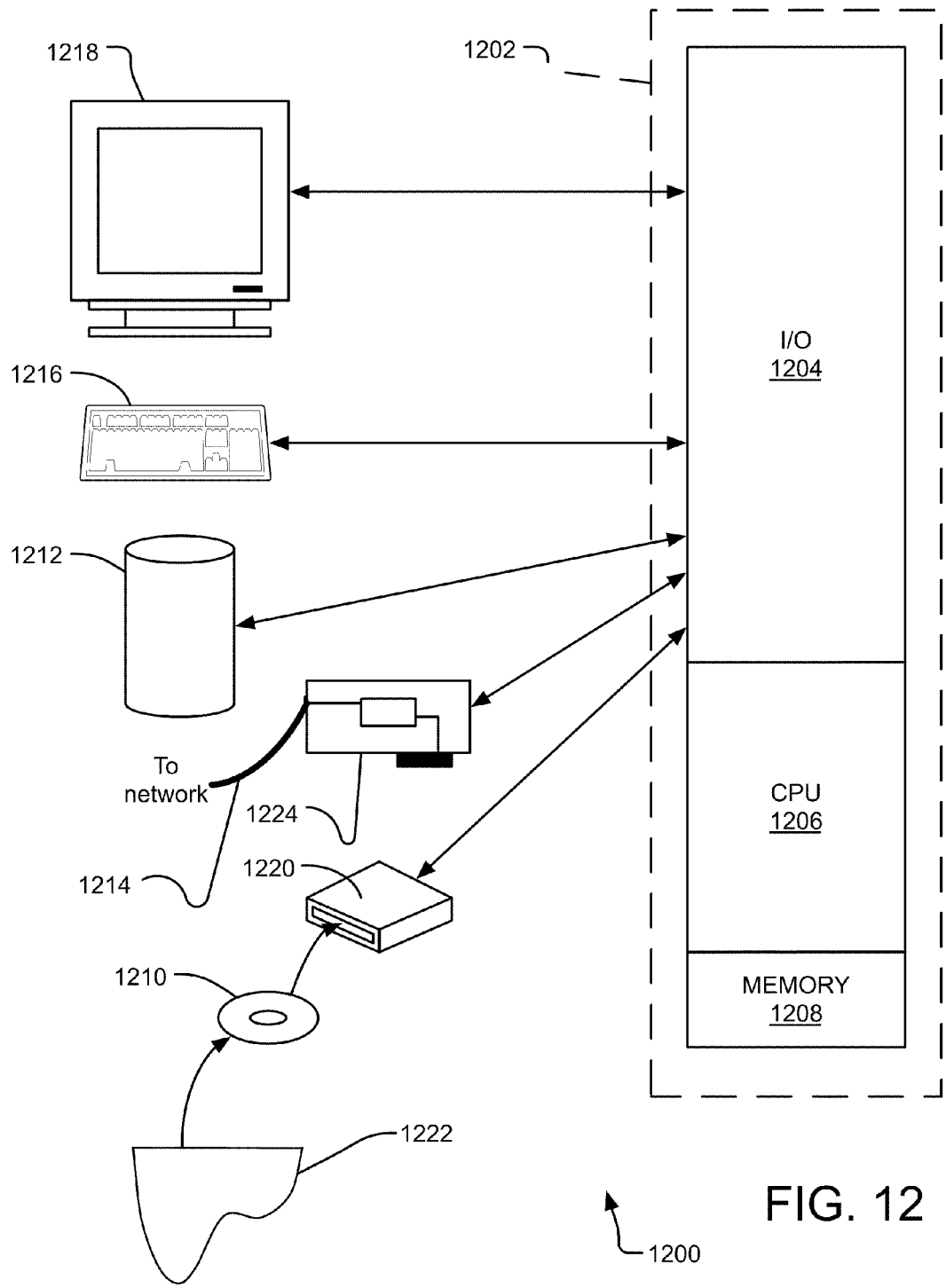
FIG. 12 illustrates an example computing system that can be used to implement the described technology.

FIG. 12 illustrates an example computing system that can be used to implement the described technology. A general purpose computer system 1200 is capable of executing a computer program product to execute a computer process. Data and program files may be input to the computer system 1200, which reads the files and executes the programs therein. Some of the elements of a general purpose computer system 1200 are shown in FIG. 12 wherein a processor 1202 is shown having an input/output (I/O) section 1204, a Central Processing Unit (CPU) 1206, and a memory section 1208. There may be one or more processors 1202, such that the processor 1202 of the computer system 1200 comprises a single central-processing unit 1206, or a plurality of processing units, commonly referred to as a parallel processing environment. The computer system 1200 may be a conventional computer, a distributed computer, or any other type of computer. The described technology is optionally implemented in software devices loaded in memory 1208, stored on a configured DVD/CD-ROM 1210 or storage unit 1212, and/or communicated via a wired or wireless network link 1214 on a carrier signal, thereby transforming the computer system 1200 in FIG. 12 to a special purpose machine for implementing the described operations.

The I/O section 1204 is connected to one or more user-interface devices (e.g., a keyboard 1216 and a display unit 1218), a disk storage unit 1212, and a disk drive unit 1220. Generally, in contemporary systems, the disk drive unit 1220 is a DVD/CD-ROM drive unit capable of reading the DVD/CD-ROM medium 1210, which typically contains programs and data 1222. Computer program products containing mechanisms to effectuate the systems and methods in accordance with the described technology may reside in the memory section 1204, on a disk storage unit 1212, or on the DVD/CD-ROM medium 1210 of such a system 1200. Alternatively, a disk drive unit 1220 may be replaced or supplemented by a floppy drive unit, a tape drive unit, or other storage medium drive unit. The network adapter 1224 is capable of connecting the computer system to a network via the network link 1214, through which the computer system can receive instructions and data embodied in a carrier wave. Examples of such systems include Intel and PowerPC systems offered by Apple Computer, Inc., personal computers offered by Dell Corporation and by other manufacturers of Intel-compatible personal computers, AMD-based computing systems and other systems running a Windows-based, UNIX-based, or other operating system. It should be understood that computing systems may also embody devices such as Personal Digital Assistants (PDAs), mobile phones, gaming consoles, set top boxes, etc.

When used in a LAN-networking environment, the computer system 1200 is connected (by wired connection or wirelessly) to a local network through the network interface or adapter 1224, which is one type of communications device. When used in a WAN-networking environment, the computer system 1200 typically includes a modem, a network adapter, or any other type of communications device for establishing communications over the wide area network. In a networked environment, program modules depicted relative to the computer system 1200 or portions thereof, may be stored in a remote memory storage device. It is appreciated that the network connections shown are exemplary and other means of and communications devices for establishing a communications link between the computers may be used.

In an example implementation, a collection engine may be incorporated in a management server as part of the operating system, application programs, or other program modules and may be a combination of hardware and/or software. In various implementations, a collection engine may be incorporated as hardware, software, or a combination thereof in various client computers, server computers, or combinations there, whether local or distributed. A collector data structure, performance values, and target device and object identifiers may be stored as program data in memory 1208 or other storage systems, such as disk storage unit 1212 or DVD/CD-ROM medium 1210.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A computing system, comprising: a processor; a non-transitory memory storing instructions that when executed by the processor cause the computing system to perform a method, the method comprising: managing one or more management information base instances, wherein a respective management information base instance is associated with a performance parameter of one or more target devices; and receiving from one or more target devices responses to performance; monitoring queries associated with performance parameters; identifying responses corresponding to a respective performance parameter by traversing the responses; and provide identified responses to a corresponding collector; adding dynamically a management information base instance for a new target device indicated by the responses.

2. The computing system of claim 1, wherein the method further comprises traversing the responses by examining the performance parameters received from the responses to discover a respective performance parameter associated with one of the collectors.

3. The computing system of claim 1, wherein the method further comprises displaying an identifier of a respective management information base instance associated with a corresponding target device.

4. The computing system of claim 1, wherein a respective collector corresponds to a performance parameter, independent of a specific target device or management information base instance.

5. The computing system of claim 1, wherein a respective performance monitoring query omits identification of a specific management information base instance.

6. The computing system of claim 1, wherein the method further comprises instructing to generate performance monitoring queries, wherein a respective performance monitoring query omits identification of a specific management information base instance.

7. The computing system of claim 1, wherein the method further comprises configuring the processor to generate the one or more performance monitoring queries.

8. The computing system of claim 1, wherein the method further comprises:
   storing at least one collector in a collector datastore; and
   providing identified responses to a corresponding collector via the collector datastore.

9. The computing system of claim 1, wherein the method further comprises traversing through the performance parameters received from the responses to the performance monitoring queries.

10. A computer-executable method, comprising:
    managing, by a computer, one or more management information base instances using at least one collector, wherein a respective management information base instance is associated with a performance parameter of one or more target devices;

receiving from one or more target devices responses to performance monitoring queries associated with performance parameters;

identifying responses corresponding to a respective performance parameter by traversing the responses;

providing identified responses to a corresponding collector; and dynamically adding a management information base instance for a new target device indicated by the responses.

11. The method of claim 10, wherein the traversing the responses comprises examining the performance parameters received from responses to discover a respective performance parameter associated with one of the collectors.

12. The method of claim 11, further comprising:

displaying an identifier of a respective management information base instance in association with an identification associated with a corresponding target device.

13. The method of claim 10, wherein a respective collector corresponds to a performance parameter, independent of a specific target device or management information base instance.

14. The method of claim 10, wherein a respective performance monitoring query omits identification of a specific management information base instance.

15. The method of claim 10, further comprising instructing to generate performance monitoring queries, wherein a respective performance monitoring query omits identification of a specific management information base instance.

16. One or more non-transitory computer-readable storage media encoding computer-executable instructions for executing on a computer system a computer process comprising:

managing one or more management information base instances using at least one collector, wherein a respective management information base instance is associated with a performance parameter of one or more target devices;

receiving from one or more target devices responses to performance monitoring queries associated with performance parameters;

identifying responses corresponding to a respective performance parameter by traversing the responses;

providing identified responses to a corresponding collector; and dynamically adding a management information base instance for a new target device indicated by the responses.

17. The one or more non-transitory computer-readable media of claim 16, wherein the traversing through the responses comprises examining the performance parameters received from responses to discover a respective performance parameter associated with one of the collectors.

18. The one or more non-transitory computer-readable media of claim 17, further comprising displaying an identifier of a respective management information base associated with a corresponding target device.

19. The one or more non-transitory computer-readable media of claim 16, wherein a respective collector corresponds to a performance parameter, independent of a specific target device or management information base instance.

20. The one or more non-transitory computer-readable media of claim 16, wherein a respective performance monitoring query omits identification of a specific management information base instance.

21. The one or more non-transitory computer-readable media of claim 16, further comprising instructing to generate performance monitoring queries, wherein a respective performance monitoring query omits identification of a specific management information base instance.

22. The one or more non-transitory computer-readable media of claim 16, further comprising storing at least one collector in a collector datastore, wherein the management server provides identified responses to a corresponding collector via the collector datastore.

\* \* \* \* \*